Patented Dec. 4, 1934

1,982,881

UNITED STATES PATENT OFFICE 1,982,881

MANUFACTURE OF COATINGS AND THE LIKE ARTIFICIAL MASSES

Wilhelm Pungs and Karl Eisenmann, Ludwigshafen-on-the-Rhine, Germany, assignors to I. G. Farbenindustrie Aktiengesellschaft, Frankfort-on-the-Main, Germany, a corporation of Germany No Drawing. Application March 13, 1929, Serial No. 346,796. In Germany March 16, 1928

3 Claims. (Cl. 134—26)

The present invention relates to the manufacture of coatings and the like artificial masses.

We have found that very valuable homogeneous products, suitable for employment as lacquers and the like artificial masses, can be prepared by combining the resinous condensation products of urea or derivatives thereof, such as thiourea, and formaldehyde, which are soluble in a butyl alcohol, with cellulose esters, in particular nitrocellulose, and with resin oil varnishes, in the presence of a substantially non-volatile or difficultly volatile softening agent which may also possess a plasticizing action and which is capable of dissolving at least part of each of the solid constituents beforedescribed, and, if desired, with the employment of organic solvents or diluents.

The aforesaid resinous condensation products can be obtained by a condensation of urea, or derivatives thereof, and formaldehyde in an organic solvent while excluding water as far as possible, for example by working with solid formaldehyde, i. e. paraformaldehyde, or gaseous formaldehyde. The organic solvents are preferably those which contain hydroxyl groups, such as alcohols generally, or ethers or esters of polyhydric alcohols still containing one or more free hydroxyl groups, the reaction being accelerated, if desired, by the addition of a small quantity of an acid agent, such as acetic acid, formic acid and hydrochloric acid or the so-called buffer compounds which are capable of continuously maintaining a weakly acid reaction when mixed with water. In most cases the condensation is finished in a short time, for example after about ½ hour and it should not be carried out at a temperature above the boiling point of the solvent employed, since otherwise insoluble products may be obtained. It is advantageous to perform the reaction by allowing the dispersion of the urea chosen to run into the heated dispersion of formaldehyde. The urea and formaldehyde may be replaced in this reaction by a methylol urea which is the reaction product of a cautious treatment of a urea and formaldehyde with an alkaline agent.

Among the substantially non-volatile substances of the said kind may be mentioned: cyclohexanol acetate, that portion of the products of the catalytic hydrogenation of oxides of carbon which boils above 150° C. and which consists mainly of higher alcohols, ketones and esters, the di-ethers, or di-esters of ethylene glycol or esters of mono-ethers thereof, alkyl or aryl or aralkyl esters of phosphoric acid, phthalic acid esters and the like. For the above described varnishes may be used varnishes of the linseed oil type, if desired containing drying agents, such as metal resinates, naphthenates or oleates and/or suitable diluents and, if desired, dyestuffs or pigments.

For the manufacture of products of the kind described above when they are to be employed as lacquers it is preferable to employ dilute solutions of the aforesaid constituents, if, however, the products are to be employed as artificial masses it is advantages to employ initial solutions as concentrated as possible. In this case the mixing operation is preferably carried out by kneading or the like mechanical operation.

The lacquers obtained in accordance with the process described above when dried on a substratum leave behind surfaces exhibiting remarkable stability to water and weather even when the lacquer contains as much urea-formaldehyde condensation product as cellulose ester and linseed oil varnish. Moreover, the said surfaces are characterized by great adhesion to the substrata, which is of great importance in lacquering polished metal surfaces. The hardness of the coating due to the condensation product of urea and formaldehyde is still further increased on account of the slow drying of the linseed oil varnish contained in the lacquer.

The quantity of linseed oil varnish added may be regulated according to requirement with regard to elasticity, hardness and adhesion in the lacquer or film.

The quantity employed of non-volatile or difficultly volatile softening agents capable of dissolving the solid substances of the lacquer is regulated according to the nature of the said substances. The quantity is usually less than that of the other non-volatile constituents of the lacquer. A few test experiments are sufficient to ascertain the minimum of such non-volatile or difficultly volatile softening agents which should be added in accordance with the special needs and/or the climate in which the lacquers are manufactured and used. The lacquers or artificial masses according to the process described above can find useful application for insulating purposes, since the disruptive strength of the layers obtained is rather high.

The following examples will further illustrate the nature of this invention, but the invention is not restricted to these examples. The parts are by weight.

*Example 1*

18 parts of a 43 per cent solution of an artificial resin of urea and formaldehyde in isobutyl alcohol are mixed with a solution of 3 parts of nitrocellulose and 6 parts of an oil varnish consisting of about 66 parts of melted Congo copal, 33 parts of boiled linseed oil and 1 part of cobalt resinate in 10 parts of butyl acetate, 25 parts of ethyl alcohol and 35 parts of toluene. After 6 parts of the oily fraction boiling between 150° and 190° C. obtained by catalytic hydrogenation of oxides of carbon are added, the lacquer obtained produces clear and very hard films. The gum varnish may be prepared from China wood oil instead of linseed oil.

Example 2

18 parts of the artificial resin solution in isobutyl alcohol described in Example 1 are mixed with a solution of 6 parts of nitrocellulose and 6 parts of an oil varnish consisting of about 33 parts of kauri copal, 66 parts of boiled linseed oil and 1 part of manganese resinate in the mixture of solvents described in Example 1. To the solution, so prepared, 6 parts of the di-isobutyl ester of phthalic acid are added. The lacquer obtained gives clear elastic and well adhering coatings. The phthalic acid ester may be replaced by phosphoric acid esters of phenols, for example, tricresylphosphate.

Example 3

A solution of 60 parts of nitrocellulose in 60 parts of butyl acetate, 120 parts of cyclohexyl acetate, 340 parts of ethyl alcohol and 300 parts of toluene is treated with 60 parts of an oil varnish consisting of equal parts of melted Zanzibar copal and boiled linseed oil with an addition of 1.5 per cent of cobalt resinate. After the oil varnish has dissolved in the nitrocellulose solution, 140 parts of a 42.6 per cent solution of a condensation product of dimethylol-urea in normal butyl alcohol are added. After intimately mixing the ingredients, a clear, transparent drying lacquer is obtained which is very stable to water. Instead of the aforesaid condensation product of dimethylol-urea a similar product obtainable from a mixture of urea and thiourea, or thiourea solely, and formaldehyde or from dimethylol-thiourea may be employed.

What we claim is:—

1. Homogeneous coating compositions comprising a resinous condensation product of a compound selected from the group consisting of urea and thiourea with formaldehyde, which condensation product is soluble in a butyl alcohol, a cellulose ester, a varnish derived from a drying oil capable of forming non-melting films and selected from the class consisting of linseed oil and China wood oil and a substantially non-volatile softening agent capable of dissolving each of the aforesaid solid constituents.

2. Homogeneous coating compositions comprising a resinous condensation product of a compound selected from the group consisting of urea and thiourea with formaldehyde, which condensation product is soluble in a butyl alcohol, a cellulose ester, a varnish derived from linseed oil, a substantially non-volatile softening agent capable of dissolving each of the aforesaid solid constituents and an organic solvent.

3. Homogeneous coating compositions comprising a resinous condensation product of a compound selected from the group consisting of urea and thiourea with formaldehyde, which condensation product is soluble in a butyl alcohol, a cellulose ester, a varnish derived from linseed oil, a substantially non-volatile softening agent capable of dissolving each of the aforesaid solid constituents, a solvent, an organic diluent and a drier.

WILHELM PUNGS.
KARL EISENMANN.